United States Patent [19]

Pirrotta et al.

[11] Patent Number: 4,970,084

[45] Date of Patent: Nov. 13, 1990

[54] PROCESS FOR MAKING POTATO-BASED CHIP PRODUCTS CONTAINING INTACT NON-POTATO PIECES

[75] Inventors: Richard S. Pirrotta; James L. Court; Timothy A. Collins, all of Cincinnati, Ohio

[73] Assignee: The Procter & Gamble Company, Cincinnati, Ohio

[21] Appl. No.: 374,334

[22] Filed: Jun. 30, 1989

[51] Int. Cl.$^5$ .............................................. A23L 1/217
[52] U.S. Cl. .................... 426/289; 426/438; 426/439; 426/549; 426/550; 426/560; 426/637; 426/808
[58] Field of Search ............... 426/289, 291, 438, 439, 426/549, 550, 560, 637, 808

[56] References Cited

U.S. PATENT DOCUMENTS

| | | | |
|---|---|---|---|
| 3,027,258 | 3/1962 | Markakis | 426/438 |
| 3,259,503 | 7/1966 | Tan | 426/439 |
| 3,282,701 | 11/1966 | Wong et al. | 426/551 |
| 3,361,573 | 1/1968 | Reinertsen | 426/21 |
| 3,527,646 | 9/1970 | Scheick et al. | 426/289 |
| 3,576,647 | 4/1971 | Liepa | 426/439 |
| 3,723,137 | 3/1973 | Fischer et al. | 426/293 |
| 3,998,975 | 12/1976 | Liepa | 426/550 |
| 4,456,624 | 6/1984 | Glantz et al. | 426/16 |
| 4,559,232 | 12/1985 | Glantz et al. | 426/96 |

*Primary Examiner*—Donald E. Czaja
*Assistant Examiner*—Evan Federman
*Attorney, Agent, or Firm*—Ronald L. Hemingway; Julius P. Filcik; Richard C. Witte

[57] ABSTRACT

Starch-based dough suitable for making fried starch-based chip-type snack foods containing non-potato food pieces, preferably vegetable pieces, that retain their physical integrity during vigorous processing and frying conditions and are visible in the finished chip product. Said dough comprises from about 50% to about 75% starch-based component; from about 30% to about 40% water; and from about 0.05% to about 4% coated non-potato food pieces. Said starch-based component is preferably dehydrated potatoes. The coating on said non-potato food pieces is a pregelatinized starch. In the process for making the dough product, pregelatinized starch is coated onto the non-potato food pieces prior to mixing said pieces into the other dough components.

4 Claims, No Drawings

PROCESS FOR MAKING POTATO-BASED CHIP PRODUCTS CONTAINING INTACT NON-POTATO PIECES

FIELD OF THE INVENTION

The field of this invention is fried chip-type snack foods made from starch-based dough to which non-potato food pieces previously coated with pregelatinized starch have been added.

BACKGROUND OF THE INVENTION

The present invention relates to fried snack foods, especially chip-type products, made from a starch-based, preferably potato-based, dough to which certain non-potato food pieces, preferably vegetable pieces, are added.

Chip-type fried snack products made from a starch-based dough have been gaining ever-increasing popularity. There are numerous variations today regarding the appearance, texture, and/or flavor of such products. For example, a popular variation is to topically apply vegetable pieces or powdered flavors or spices to the finished chip product. A problem with these products, however, is that the added pieces or powder tend to become separated from the chip during packaging, shipping, and/or storage.

Another popular variation is to incorporate certain inert non-potato foodstuffs into the dough used to formulate said chip-type products. (See, for example, U.S. Pat. No. 3,259,503 to Tan et al., (assigned to Continental Baking Co.), issued July 5, 1966; U.S. Pat. No. 3,282,701 to Wong et al., issued Nov. 1, 1966; U.S. Pat. No.3,361,573 to Reinertsen, issued Jan. 2, 1968; and U.S. Pat. No. 3,027,258 to Markakis et al. (assign Food Industries, Inc.) issued Mar. 27, 1962; all hereby incorporated herein.) A particular problem that occurs during processing the doughs containing said non-potato foodstuffs, especially when said doughs are subjected to vigorous preparation, processing, and/or frying, is that the food pieces incorporated within said dough lose their physical and structural integrity, are reduced in particle size, and as a result are not visible or distinguishable in the final product. This is particularly evident when the doughs are subjected to vigorous frying to produce a snack product. Under high temperature frying conditions, the moisture within the dough is vaporized to steam and is forcefully expelled from the snack product through a series of capillaries and pores leading to the snack food's surface. During steam escape from a starch-based snack food product, incorporated non-potato food pieces may also be expelled from the product with the steam, depending upon their degree of adherence to the dough. In addition, non-potato food pieces may be moved so close to the snack surface by the steam velocities that subsequent handling during packaging, shipping, and/or storage may cause the non-potato food pieces to be separated from the snack product.

In order to minimize particle size attrition during processing and to preserve the natural color of non-potato food pieces within starch-based snack products, it is necessary that the non-potato food pieces remain physically intact within the structure of the snack product. The breaking apart of the non-potato food pieces in the dough in the presence of high shear, temperature, and/or moisture compromises the capacity of the dough to form a satisfactory final product. As a result, said dough often produces a final product that is discolored and/or has no visible or distinguishable non-potato food pieces within the snack product. These problems are especially evident when doughs must be mill-rolled into sheets, cut into chip-type shapes, and/or deep-fat fried.

It is an object of the present invention to provide a starch-based chip-type snack food product having incorporated therein discrete individual non-potato food pieces which retain their physical integrity, show minimal particle size degradation, and are visible and distinct in the final food product.

It is a further object of the present invention to create a chip-type snack food product incorporating non-potato food pieces wherein the final snack product has an excellent appearance and texture.

These and other objects of the invention will become clear by the disclosure herein.

All percentages and ratios are by weight, unless otherwise indicated.

SUMMARY OF THE INVENTION

In accordance with the present invention, it has now surprisingly been found that, when said non-potato food pieces are first coated with pregelatinized starch before being incorporated into a starch-based dough formulation, said non-potato food pieces: (1) maintain their physical integrity within the snack food structure; (2) show minimal particle size degradation; (3) retain their natural color and do not bleed into the dough of the snack food; and (4) remain visible and distinguishable in the finished snack product.

The pregelatinized starch coating on the non-potato food pieces may be continuous or non-continuous, so long as the pregelatinized starch is present on the non-potato food pieces in the amount of about 1% to about 50%, by weight of said food pieces. It is preferable that the non-potato food pieces be coated with about 1% to about 15% pregelatinized starch, by weight of said food pieces.

"Starch-based components" as used herein includes naturally occurring, high polymeric carbohydrates composed of glucopyranose units, in either natural, dehydrated or flour form. Said starch-based components include, but are not limited to, wheat, corn, rice, oats, barley, soybeans, and, preferably, potatoes, and any mixture thereof. When potatoes are utilized, it is most preferable that said potatoes are used in a dehydrated form.

"Dehydrated potatoes" as defined herein is the preferred type of starch-based component and encompasses all types of dehydrated cooked potatoes used in the art to process the dough used in making fabricated potato chip-type products and other farinaceous snacks. Said dehydrated cooked potatoes can be in flake, granular or powder form as will be described more fully herein.

"Non-potato food pieces" as defined herein encompasses fresh, dried or dehydrated food pieces and includes non-potato materials such as, but not limited to, parsley; chives; garlic or garlic skins; white, red, green, or yellow onions or onion skins; tomatoes or tomato skins; carrots; dill; broccoli; red or green peppers or pepper skins; or mixtures thereof.

"Pregelatinized starch" as defined herein includes both modified and non-modified pregelatinized starch and is most preferably pregelatinized wheat starch, but also includes, but is not limited to, pregelatinized starches prepared from starch materials such as corn, tapioca, potato, waxy maize, rice, and mixtures thereof.

In accordance with the present invention, non-potato food pieces are coated (with a continuous or non-continuous coating) with either modified or non-modified pregelatinized starch before being admixed with the starch-based component of the dough prepared as described hereinbelow. Said non-potato food pieces are coated with from about 1% to about 50%, preferably from about 1% to about 15%, more preferably about 3% to about 7%, most preferably about 5%, pregelatinized starch by weight of said food pieces.

In preparing the dough of the present invention, from about 0.05% to about 4%, preferably about 0.05% to about 1%, most preferably about 0.1%, of said non-potato food pieces coated with pregelatinized starch are incorporated into the starch-based component of the dough.

Although any of a number of starch-based components are available and suitable for use herein, the starch-based component is preferably potatoes and most preferably dehydrated potatoes. The potato-based dough preferred for use herein is that prepared utilizing rehydrated dehydrated potatoes according to the method disclosed in U.S. Pat. No. 3,998,975 to Liepa (assigned to The Procter & Gamble Company), issued Dec. 21, 1976, and hereby incorporated by reference. Said potato component preferably has a reducing sugar content of from 0% to about 5% by weight and an iodine index of from about 0.01 to about 6, said dough having a lipid content defined by the following relationship:

$$Y = AX^{0.40},$$

wherein Y is the lipid content of the dough in percent by weight of potato component, A has a value less than or equal to 2.70, and X is the iodine index of the potato component which ranges from about 0.01 to about 6.

The starch-based dough of the present invention comprises (a) from 50% to about 75%, preferably from about 55% to about 70%, most preferably about 65%, of a starch-based component; (b) from about 30% to about 40%, preferably about 34% to about 38%, most preferably about 35%, water; and (c) from about 0.05% to about 4%, preferably from about 0.05% to about 1%, most preferably about 0.1%, of coated non-potato food pieces, wherein the coating on said food pieces is a pregelatinized starch and comprises from about 1% to about 50%, preferably about 1% to about 15%, more preferably about 3% to about 7%, most preferably about 5%, pregelatinized starch (by weight of said non-potato food pieces).

The most preferred starch-based dough of the present invention comprises from about 50% to about 75%, preferably about 55% to about 70%, most preferably about 65%, dehydrated potato component based on dried potato weight.

If desired, the dough formulation may also include from about 0.5% to about 2.5%, preferably about 1%, of an emulsifier or emulsifier blend. Said emulsifier should preferably consist of 30%-40% monoglycerides and 12%-18% triglycerides, with the remainder being diglycerides. It is well within the ability of one skilled in the art to vary the emulsifier used to achieve desired characteristics in a particular food application.

The dough of the present invention is prepared by first admixing the non-potato food pieces which have been coated with pregelatinized starch with the starch-based component. Next, the added water is intimately admixed with the starch-based component/coated food pieces mixture to form a coherent, workable dough. During the mixing of the water with the starch-based component/coated food piece mixture, an emulsifier may be added, if desired.

After the above-described dough has been prepared, it can be formed into suitable shapes which can be deep-fat fried to provide the starch-based snack products of the present invention. The starch-based component is preferably potatoes, and most preferably dehydrated potatoes. Chip-type products are the preferred particular potato products of the present invention. Accordingly, the finished starch-based chip-type products of the present invention contain a starch-based component and non-potato food pieces. Preferably, the ratio of starch-based component to non-potato food pieces is preferably from about 19:1 to about 999:1, most preferably about 750:1 to about 999:1.

DETAILED DESCRIPTION OF THE INVENTION

The present invention relates to fried snack foods, especially chip-type products, made from a starch-based dough containing within the dough structure non-potato food pieces which retain their physical integrity, and appearance, and show minimal particle size attrition, even when said dough is subjected to rigorous preparation and frying.

The dough of the present invention contains from about 0.05% to about 4%, preferably about 0.05% to about 1%, most preferably about 0.1%, non-potato food pieces, preferably vegetable pieces, that have been coated with pregelatinized starch before being incorporated into the starch-based component of the dough. The starch-based component is preferably potatoes and most preferably dehydrated potatoes, which are prepared as described hereinbelow.

Various types of fresh, dried, or dehydrated non-potato food pieces are suitable for incorporation into the starch-based dough of the present invention. Vegetable pieces are preferred, and may be selected from the group consisting of, but not limited to garlic or garlic skins; onions or onion skins; chives; parsley; peppers or pepper skins; tomatoes or tomato skins; carrots; dill; broccoli; or mixtures thereof. The non-potato food pieces may be of any shape, but it is preferable that the pieces have the dimensions of between 0.002 in. —0.500 in. (0.005 cm—1.27 cm). The non-potato food pieces may be reduced in size by any method known to the art, but milling, cutting, and/or chopping are preferred. It is also most preferable that the non-potato food pieces to be incorporated in the dough be dehydrated.

Non-potato food pieces of the proper dimensions are coated with from about 1% to about 50%, preferably about 1% to about 15%, more preferably from about 3% to about 7%, most preferably about 5%, pregelatinized starch by weight of said food pieces. As stated above, the coating of pregelatinized starch on the non-potato food pieces may be continuous or non-continuous, so long as the amount of pregelatinized starch relative to the amount of non-potato food pieces is sufficient.

Any type of pregelatinized starch (including either modified or non-modified pregelatinized starch) is suitable for use in coating said non-potato food pieces.

While pregelatinized wheat starch is most preferred (such as, for example, Ogilvie Paygel ® 290, manufactured by Ogilvie Mills, Inc., Baker Technology Plaza, 6121 Baker Road, Suite 101, Minnetonka, MN 35345), other suitable pregelatinized starches may be selected from the group consisting of, but not limited to, cornstarch, potato starch, rice starch, waxy maize starch, tapioca starch, or mixtures thereof.

Coating is preferably performed in a tumbler, but may be done by any workable method, including by hand. The food pieces may be premoistened before being subjected to batch tumbling with dry pregelatinized starch, but it is preferable that dry food pieces are tumbled with the dry pregelatinized starch in a batch tumbler. A suitable tumbler is a Cherry-Burrell Pill Coater (Model #16V5, Cherry-Burrell Corp., Cedar Rapids, IA), but any method of coating the non-potato food pieces with pregelatinized starch is suitable. Both the tumbling of the non-potato food pieces in the dry state and the tumbling of food pieces already premoistened before tumbling should be performed for about 1 minute to about 10 minutes, preferably about 5 minutes, at about 100–200 rpm. If the food pieces are to be premoistened before being subjected to tumbling with pregelatinized starch, they are preferably premoistened with water, most preferably hot water or steam, but any other liquid may be used, including, but not limited to, vegetable juice, milk, bouillon, broth, or any mixture thereof.

It is also possible to coat the non-potato food pieces with pregelatinized starch via an encapsulation process. The food pieces are contacted with from about 5% to about 15%, preferably about 5%, (by weight of the food pieces) of an about 6% to about 20%, preferably an about 9%, pregelatinized starch solution in water in a Wurster Coating Chamber (4 in./6in. Wurster Fluid Bed Coater, Model 101, Lakso Co., Leominster, MA). The chamber should be operated at a cycle time of 2 to about 15 minutes, preferably about 5 minutes.

In order to create dough which contains non-potato food pieces which retain their physical structure, appearance and particle size, said food pieces coated as described hereinabove with pregelatinized starch are added to the starch-based component of the dough. The starch-based component/coated non-potato food piece mixture is then mixed with water, and, if desired, emulsifier.

Said starch-based component is preferably potatoes and most preferably dehydrated potatoes. There are numerous potato-based doughs which utilize a dehydrated potato component and are made from rehydrated dehydrated potatoes. Said doughs are suitable for use in the present invention and include the following doughs, described in the following U.S. Patents, all incorporated by reference herein. U.S. Pat. No. 3,027,258 to Markakis et al. (assigned to DCA Food Industries, Inc.), issued Mar. 27, 1962; 3,085,020 to Backinger et al. (assigned to The General Food Corp. issued Apr. 9, 1963; 3,396,036 to Liepa (assigned to The Procter & Gamble Company), issued Aug. 6, 1968; 3,259,503 to Tan et al. (assigned to Continental Baking Co.), issued July 5, 1966; 3,282,701 to Wong et al., issued Nov. 1, 1966; and 3,361,573 to Reinertsen, issued Jan. 2, 1968.

Most preferably, the doughs utilized in the present invention are the specific doughs disclosed in U.S. Pat. No. 3,998,975 to Liepa (assigned to The Procter & Gamble Company), and issued Dec. 21, 1976, incorporated herein by reference. While the flavors and textures of the chip products made from frying the doughs described by Liepa are satisfactory, a chip product exhibiting an alternative flavor and texture can be achieved by incorporating the non-potato food pieces precoated with pregelatinized starch as described above herein into the potato dough. The dehydrated potato component described therein preferably has a reducing sugar content of from 0% to about 5% by weight and an iodine index of from about 0.01 to about 6, said dough having a lipid content defined by the following relationship:

$$Y = AX^{0.40},$$

where Y is the lipid content of the dough in percent by weight of dehydrated potato component, A has a value less than or equal to 2.70, and X is the dehydrated potato component iodine index which ranges from about 0.01 to about 6.

Specifically, the dough of the present invention is prepared by first mixing non-potato food pieces and a starch-based component, most preferably dehydrated potatoes, and then intimately admixing water with the starch-based component/food piece mixture to form a coherent, workable dough.

Although it is preferable to use a dehydrated potato component as the starch-based component, the dough of the present invention can be made from any starch-based component and comprises from about 50% to about 75%, preferably from about 55% to about 70%, most preferably about 65%, starch-based component; from about 30% to about 40%, preferably from about 34% to about 38%, most preferably about 35%, water; and from about 0.05% to about 4%, preferably about 0.05% to about 1%, most preferably about 0.1%, non-potato food pieces, wherein the coating on said food pieces is a modified or unmodified pregelatinized starch and comprises from about 1% to about 50%, preferably about 1% to about 15%, more preferably about 3% to about 7%, most preferably about 5%, pregelatinized starch by weight of said non-potato food pieces.

The most preferred starch-based dough of the present invention comprises from about 50% to about 75%, preferably from about 55% to about 70%, most preferably about 65% dehydrated potatoes based on dried potato weight.

As disclosed herein, the starch-based component most preferred for use in the present invention is dehydrated cooked potatoes. Said dehydrated potatoes can be in either flake, granular, or powdered form (potato flour). These dehydrated potato products are made by drying cooked mashed potatoes. Although the dehydrated potato component of the potato-based dough of the present invention can be derived from either the flake, granular, or powdered form, the most preferred form of said component depends upon the type of process used for forming (i.e., shaping) the dough before frying the food product to be made. For example, if a rolling and cutting type method of forming the (i.e., shaping) potato-based dough is to be used, (which is the preferred method for making the chip products of the present invention), either flakes, granules, or flour may be used, and the preferred dehydrated potato component would consist of a mixture consisting of from about 70% to about 95%, preferably about 90%, potato flakes, and of from about 5% to about 30%, preferably about 10%, potato granules. However, if an extrusion method is used in order to form the dough, the flake or granular forms are most preferred because the cell walls of these forms of potato components are substantially intact. Likewise, potato components in the flour form are not preferred for use in dough which is to be extruded, as potato flour consists of ruptured potato cells which cannot satisfactorily withstand the extrusion process. See, for example, U.S. Pat. No. 3,396,036 to Liepa (assigned to The Procter & Gamble Company), issued Aug. 6, 1968, incorporated herein by reference.

The flakes for use as the dehydrated potato component can be made according to a number of known processes, including those discussed in the following U.S. Patents, all assigned to the United States of America, Secretary of Agriculture, and all incorporated by reference herein: 2,759,832 to Cording, issued Aug. 21, 1956; 2,780,552 to Willard, issued Feb. 5, 1957; and 2,787,553 to Cording, issued Apr. 2, 1957. The granules for use as the dehydrated potato component can also be made according to known processes, including those described in the following U.S. Patents, both incorporated by reference herein: 2,490,431 to Greene et al. (assigned to Research Corp., New York, NY), issued Dec. 6, 1949, and 2,520,891 to Rivoche (assigned to Farmers Marketing and Supply Co., Ltd., London, England), issued Aug. 29, 1950. Potato flour for use as the dehydrated potato component is made by drum drying cooked mashed potatoes to a thin sheet which is then ground to a desired fineness.

Dehydrated potato flakes typically have a moisture content of about 7% by weight and have their potato cells substantially intact with a minimum of free starch. In addition, various stabilizers and preservatives are usually employed to improve the stability and texture of the flakes. For example, antioxidants such as BHA (2 and 3 tert-butyl-4-hydroxy-anisole) and BHT (3,5-di-tert-butyl-4-hydroxytoluene) are added in amounts up to a total of about 10 p.p.m. to prevent oxidative deterioration. Citric acid is generally added in a quantity sufficient to give about 90 p.p.m. in the dried product to prevent discoloration caused by the presence of ferrous ions. Monoglycerides such as glycerol monopalmitate or glycerol monostearate are also added to the wet mash prior to drying in amounts ranging from about 0.4% to about 1% by weight to improve the texture of the reconstituted mash.

Dehydrated potatoes in granular form have a moisture content of about 6% by weight and are composed of substantially unicellular potato particles which have their cell walls intact and which are capable of passing through about a No. 60 to about a No. 80 U.S. Series sieve. Antioxidants such as BHA and BHT are added in amounts not exceeding 10 p.p.m. of both to prevent oxidative deterioration.

Potato flour is made by drying cooked mashed potatoes to a moisture level of about 6% by weight and grinding the dry product to a given particle size, generally from about 70 to about 180 microns. Unlike the dehydrated potato flakes and granules described above, however, potato flour is comprised of substantially 100% ruptured potato cells.

Any of the above described forms of dehydrated potatoes, or mixtures thereof, (i.e., flakes, granules, and/or flour), with or without the additives, can be used as the dehydrated potato component in practicing this invention, especially if the preferred free starch content requirement is met. A dehydrated potato component having a reducing sugar content between 0% and about 5.0% by weight, preferably between about 0.4% and about 2.0% by weight, is preferred when making potato-chip type snack food products to maintain the desired light color in the fried chips since an excessive reducing sugar content adversely increases the rate of browning of the chip product. While the reducing sugar content is dependent upon that of the potatoes which were employed to prepare the dehydrated potato component, the amount of reducing sugar in the dehydrated product can be increased by adding suitable amounts of reducing sugars such as glucose, maltose, lactose, and the like.

Any dehydrated potato component prepared from high quality potatoes can be used in this invention including Kennebec, Russet, Burbank, Idaho Russet, and Sebago potatoes.

The lipid content of dehydrated potato component is usually well below about 1%, but it can be increased (when desired to improve the physical properties of the dough) to any level above about 1% by the addition of a suitable amount of fatty substances such as, for example, mono-, di-, and triglycerides of fatty acids, such as monopalmitin, monostearate, monolein, dipalmitin, and tripalmitin, and partial fatty esters of glycols, such as propylene glycol monostearate and monobehenate. The lipid can be added to the dehydrated potato component or it can be added to the water. It is important, however, that the lipid be uniformly dispersed in whichever component it is mixed.

The total moisture content of the starch-based dough of the present invention can range from about 25% to about 50%, preferably from 30% to about 40%, most preferably about 35%; this includes the moisture content of the starch-based component, and the non-potato food pieces incorporated therein. The dough, then, comprises from about 50% to about 70%, preferably about 55% to about 70%, most preferably about 65%, of a starch-based component; from about 30% to about 40%, preferably about 34% to about 38%, most preferably about 35%, water; and from about 0.05% to about 4%, preferably from about 0.05% to about 1.0%, most preferably about 0.1%, coated non-potato food pieces, wherein the coating on said food pieces is a pregelatinized starch and comprises from about 1% to about 50%, preferably about 1% to about 15%, more preferably about 5% to about 7%, most preferably about 5% (by weight of said non-potato food pieces), pregelatinized starch.

As previously stated, the starch-based component is preferably potatoes and most preferably dehydrated potatoes. Accordingly, the starch-based dough of the present invention comprises from about 50% to about 75%, preferably about 55% to about 70%, most preferably about 65% of a dehydrated potato component based on dried potato weight.

If desired, from about 0.5% to about 2.5%, preferably about 1.0%, of an emulsifier can be included in the starch-based dough formulation. Said emulsifier may be selected by one skilled in the art from any emulsifier or emulsifier blend available in the industry, according to the particular application and the attributes desired. A particularly preferred emulsifier has from about 30% to about 40% monoglycerides, and from about 12% to about 18% triglycerides, with the remainder being diglycerides. An emulsifier of this type is Myvatex Dough Control K Strengthener, (manufactured by Eastman Chemical, a division of Eastman Kodak, Rochester, NY). Other types of suitable emulsifiers include distilled monoglycerides produced by various manufacturers such as, for instance, Grinsted Products, Inc., Kansas City, KS, and mono-diglycerides produced by various manufacturers such as, for instance, Durkee Foods Division, SCM Corporation, Joilet, IL.

In preparing the above described starch-based dough, the starch-based component is preferably mixed with the non-potato food pieces (coated with pregelatinized starch), prepared as described above. This mixture is most preferably mixed utilizing an industrial mixer (such as, for instance, a Hobart mixer, Model A-200TG made by Hobart Mfg., Co., Troy, OH) for about 1 to about 10 minutes, more preferably about 5 minutes, on low speed. The resulting starch-based component/non-potato food piece mixture is next placed in any suitable turbulizer (for instance, a Double Helix TS-8 (32 paddle) manufactured by Strong Scott Bepex Mfg. Co., 451 Taft Street, N.E., Minneapolis, MN 55413), which is jacketed with water at 140° F. (60° C.). To this mixture is added streams of the emulsifier and water, preferably at 180° F. (82.2° C.). The turbulizer is operated at about 100 to about 1500 rpm, preferably at about 1000 to about 1200 rpm, with a mean dough residence time of about 3 to about 15, preferably about 7.5, seconds.

After the above-described dough has been prepared, it can be formed into suitable shapes which can be deep-fat fried to provide the starch-based snack products of the present invention. The sizes and shapes of the products into which the dough can be formed are endlessly variable. Chip-type products are the preferred starch-based snack products of the present invention, and the starch-based component is preferably potatoes, most preferably dehydrated potatoes. The finished starch-based chip-type products of the present invention contain a starch-based component and coated non-potato food pieces in the ratio of starch-based potato component to non-potato food pieces is about 19:1 to about 999:1, most preferably about 750:1 to about 999:1.

Conventional potato chips made from a slice of raw potato can be very closely simulated by passing the dough, utilizing a dehydrated potato component such as potato flakes, granules, flour, or mixtures thereof, prepared as described above, between a series of spaced mill rolls to form a sheet of dough ranging in thickness from about 0.015 in. (0.038 cm) to about 0.04 in. (0.11 cm), and preferably from about 0.020 in. (0.051 cm) to about 0.030 in. (0.076 cm). The dough sheet so formed can be cut into elliptical pieces having the approximate size and shape of sliced potatoes and then fried in a conventional chip-frying apparatus. Alternatively, apparatus such as that described in U.S. Pat. No. 3,576,647 to Liepa (assigned to The Procter & Gamble Company), issued Apr. 27, 1971 and incorporated by reference herein, can be used to produce uniformly-shaped chips.

In order to provide chips which have a surface conformation and shape similar to conventional chips made by frying thin slices of raw potatoes, it is preferred that the frying be performed with the chips constrained between a pair of closely fitting, similarly configured shaping molds which have apertures to permit the hot frying fat to come into intimate contact with the dough. Although the dough formulations herein described are particularly suited for preparing molded chips by constraining them during the frying operation, it is not necessary that the frying be performed with the dough in a constrained condition. Satisfactory chips or other starch-based products can be produced by freely passing cut dough pieces through hot frying fat.

The frying can be done in conventional triglyceride oils, or, if desired, the frying can be done in low calorie fat-like materials such as those described in U.S. Pat. Nos. 3,600,186 to Mattson et al., issued May 12, 1970; 4,005,195 to Jandacek, issued Jan. 25, 1977; 4,005,196 to Jandacek et al., issued Jan. 25, 1977; 4,034,083 to Mattson issued July 5, 1977; and 4,241,054 to Volpenhein et al., issued Dec. 23, 1980; European Patent Publication No. 0,236,288 to Bernhardt, published Sept. 9, 1987; and European Patent Publication No. 0,23,856 to Bernhardt, published Aug. 26, 1987 (all assigned to The Procter & Gamble Company) and all incorporated by reference herein.

Exemplary of a low calorie fat-like material for use as the frying medium is a mixture of hexa-, hepta-, and octa-esters of sucrose and medium- and long-chain fatty acids obtained from edible fats and oils and/or fatty acid sources. Fatty acids with chain lengths of 2 to 24, preferably 8 to 24, most preferably 14 to 18, carbon atoms can be used.

Reduced calorie shortenings and oils used to prepare the potato-based fried snack food products typically can contain up to 75% or more by weight of the noncaloric fat-like material. These shortenings and oils are preferably supplemented with Vitamin E at a level of 1.0 mg d-alpha-tocopherol equivalents per gram of non-caloric fat-like material.

An example of a shortening made with the above-mentioned sucrose polyester non-caloric fat-like material is as follows: 35% non-caloric fat-like material, 53% liquid triglyceride, 7% hardstock triglyceride, and 5% emulsifier. In particular, preferred non-caloric, fat-like materials of this type will contain not less than 70% of octa-esters. One non-caloric fat-like material of this type is comprised of 93.9% octa-ester, 6.1% hepta-ester, less than 0.1% tetra- and lower esters. The fatty acid composition of the non-caloric fat-like material of this example is 13.5% $C_{16}$ (palmitic acid), 41.7% $C_{18}$ (stearic acid), 39.3% $C_{18-1}$ (oleic acid and/or elaidic acid), 3.9% $C_{18-2}$ (linoleic acid), 0.0% $C_{18-3}$ (linolenic acid), 0.4% $C_{20:1}$ (eicosenoic acid), and 1.2% of other fatty acids not listed above.

A shortening could also be made with 75% of the above-mentioned sucrose polyester non-caloric fat-like material and 25% cottonseed oil; where the fat-like material contains 85.2% octa-ester, 14.8% hepta-ester, less than 0.1% hexa-ester, less than 0.1% penta-ester, and less than 0.1% tetra- and lower esters; and where the fatty acid composition of the fat-like material is 10.7% $C_{16}$ (palmitic acid), 58.8% $C_{18}$ (stearic acid), 16.4% $C_{18-1}$ (oleic acid and/or elaidic acid), 11.8% $C_{18-2}$ (linoleic acid), 1.1% $C_{18-3}$ (linolenic acid), 0.5% $C_{20:1}$ (eicosenoic acid), and 0.7% other fatty acids not listed above.

The frying operation can be carried out with the frying fat at a temperature of from about 275° F. (135° C.). to about 400° F. (205° .C), but is preferably performed at a fat temperature of from about 315° F. (157° C.) to about 375° F. (191° C.). for a time of about 5 seconds to about 60 seconds, preferably from about 5 to about 30 seconds. Any edible cooking oil or shortening is a suitable medium for frying. The principal factor which influences the frying time is the color of the fried chip, which, when dehydrated potatoes are used as the starch-based component, is primarily a function of the reducing sugar content of the dehydrated potatoes.

Other factors which affect chip color in snacks made from starch-based dough are the presence of undesired color of the starch-based component, the thickness of the chip, the temperature of the frying oil, and the type of oil used.

The following examples will further illustrate the invention described herein.

EXAMPLE 1

Chip-Type Potato Products with Parsley Flakes

Chip-type potato products with parsley flakes are made according to the following procedure:

| Ingredient | Weight Percent of the Dough Formulation |
|---|---|
| Starch-Based Component | |
| Potato Flakes [no more than 30% of which will pass through a U.S. #40 (Tyler 35) mesh (Magic Valley Foods, Inc., 100 South & 50 West, P.O. Box 475, Rupert, ID 83350)] | 59.3693 |
| Potato Granules [Basic American Foods Co., American Potato Division, P.O. Box 592, Blackfoot, ID 83221] | 6.5746 |
| Coated Parley Flakes | |
| Deydrated Parsley Flakes [no more than 15% of which pass through a U.S. #40 mesh] | 0.1255 |
| Pregelatinized Wheat Starch [Ogilvie Paygel ® 290, Ogilive Mills, Inc., Baker Technology Plaza, 6121 Baker Road, Suite 101, Minnetonka, MN 55345] | 0.0066 |
| Added Water | 33.3233 |
| Emulsifier [mixture of 33–38% monoglyceride, 10–12% triglyceride, and the remainder diglyceride, manufactured from partially hydrogenated vegetable oil] | 0.6007 |

Dehydrated parsley flakes are first coated with the pregelatinized wheat starch. To prepare the coated parsley flakes, 14 lbs. (6350 gs) of the dehydrated parsley flakes having a moisture content of 2% are coated with 2.1 lbs. (952 gs) pregelatinized wheat starch in a Cherry-Burrell Pill Coater (Tablet Polisher) (Serial #2777, Model #16VS, Cherry-Burrell Corp., Cedar Rapids, IA [model discontinued in 1966]). The dry-dry coating process is carried out for 5 minutes at a 134 rpm to achieve a 15% coating level (by weight) of the pregelatinized starch on the parsley. The 15% coating provides does not provide a continuous film on the surface of the parsley, but rather randomly distributes pregelatinized wheat starch on sites on the parsley surface forming a non-continuous coating.

The starch-based component is dehydrated potatoes and consists of potato flakes (moisture content of about 7%) and the potato granules (moisture content of about 6%). The coated parsley flakes are then combined with the dehydrated potato component in a Hobart mixer (Model #A-200TG, Serial #1297350, Hobart Mfg. Co., Troy, OH) and are mixed for 5 minutes on low speed.

The resulting dry mixture is then placed in a turbulizer (Model: Double Helix TS-8 (32 paddles), Strong Scott Bepex Mfg. Co., 451 Taft Street, N.E., Minneapolis, MN 55413), which is jacketed with water at 140° F. (60° C.). To this mixture, emulsifier and water are added at 180° F. (82.2° C.). The turbulizer is operated at 1050 rpm with a mean dough residence time of 7.5 seconds.

The resulting dough mixture is sheeted through a T. L. Green 3-Roll Sheeting and Gauging Roll System consisting of Model Nos. S/N 85-1064 and 85-1065; manufactured by Thomas L. Green & Co., Inc., 202 North Miley Ave., Indianapolis, IN. Sheet thicknesses are set at 0.040 inch (0.1016 cm) on the milling roll, 0.35 inch (0.0889 cm) on the first gauging roll, and 0.030 inch (0.0762 cm) on the second gauging roll. The mill roll speeds are set at 7, 12, and 21 rpms, respectively.

The doughsheet is cut into round dough ovals and is subjected to vigorous frying in cottonseed oil in a constrained mold carrier at 350° F. (176.7° C.) for 10–12 seconds. The resulting chip product has a uniform color and parsley pieces are green, visible, and physically intact within the finished chip structure. The dough exhibits no green bleeding from the parsley pieces incorporated therein.

EXAMPLE 2

Chip-type Potato Products with ParsleY Flakes

Chip-type potato products with parsley flakes are made according to the method described in Example 1, except the coated parsley flakes are prepared via an encapsulation process. 40 lbs. (18.2 kgs) 9% pregelatinized starch solution in water is added to 15 lbs. (6.71 kgs) dehydrated parsley flakes in a Wurster Coating Chamber (4 in./6 in. Wurster Fluid Bed Coater, Model 101, Lakso Co., Leominster, MA). The pregelatinized starch solution is added at an operating temperature of 140° F. (60° C.), and then the solution is combined with the parsley flakes at 160° F. (71.7° C.), in the Wurster Coating Chamber which is operated at a cycle time of 5 minutes.

The above-described process coats the parsley flakes at a 10% pregelatinized starch level (by weight of the parsley flakes) on the parsley flakes. The 10% starch level on the parsley does not provide a continuous film on the surface of the parsley, but rather randomly distributes pregelatinized wheat starch on sites on the parsley surface forming a non-continuous coating. The resulting chip product has a uniform color and parsley pieces are green, visible, and physically intact within the finished chip structure. The dough exhibits no green bleeding from the parsley pieces incorporated therein.

EXAMPLE 3

Chip-Type Potato Products with Parsley Flakes

Chip-type potato products with parsley flakes are made according to the method described in Example 1, except that the coated parsley flakes are prepared from fresh parsley instead of dehydrated parsley flakes. Fresh parsley having a moisture content of about 8% is cut into pieces having a size of 0.25 in. (0.635 cm)–0.50 in. (1.270 cm). Said parsley is coated utilizing the coating process of Example 1. The parsley is coated with 40% (by weight of the parsley) of dry pregelatinized wheat starch. The excess moisture in the fresh parsley is quickly absorbed by the pregelatinized wheat starch during the coating process, allowing for ease of handling and addition of fresh parsley in the preparation of the dough. The dough is prepared and fried as in Example 1. The resulting chip-type product has a uniform color with parsley pieces which are green, visible and physically intact within the finished chip structure. The parsley pieces in the finished chip product are slightly smaller than those in chip products made utilizing dehydrated parsley instead of fresh parsley. The dough exhibits no green bleeding from the parsley pieces incorporated therein.

EXAMPLE 4

Chip-Type Potato Products with Peppers

In place of the dehydrated parsley flakes in Example 1, dehydrated green bell peppers (manufactured by The Kroger Company, Cincinnati, OH 45201) are used in the chip-type product.

The resulting chip-type product has a uniform color and pepper pieces which are green, visible, and physically intact within the finished chip structure. The dough exhibits no green bleeding from the pepper pieces incorporated therein.

What is claimed is:

1. A process for making starch-based chip-type products comprising the steps of:
    (a) coating fresh, dried, or dehydrated non-potato food pieces with pregelatinized starch;
    (b) mixing the coated non-potato food pieces with a starch-based potato component;
    (c) adding water to the starch-based potato component/ non-potato food piece mixture to form a dough;
    (d) passing said dough between a series of spaced mill rolls to form a sheet of dough;
    (e) cutting said dough into elliptical pieces; and
    (f) frying said pieces in a frying medium.

2. A process according to claim 1 wherein from about 0.5% to about 2.5% of an emulsifier is added along with the water to the starch-based component/coated non-potato food piece mixture in step (c).

3. A process according to claim 1 wherein the frying medium of (f) comprises a low-calorie fat-like material.

4. A process according to claim 3 wherein the low-calorie fat-like material comprises a mixture of hexa-, hepta-, and octa-esters of sucrose and fatty acids with chain lengths of 2 to 24 carbon atoms.

* * * * *